(12) United States Patent
Krieger et al.

(10) Patent No.: US 11,665,055 B2
(45) Date of Patent: May 30, 2023

(54) METHOD AND DEVICE FOR CONFIGURING IDENTICAL NETWORK COMPONENTS, AND TRANSPORTATION VEHICLE

(71) Applicant: VOLKSWAGEN AKTIENGESELLSCHAFT, Wolfsburg (DE)

(72) Inventors: Olaf Krieger, Lostau (DE); Alexander Meier, Wolfsburg (DE); Felix Dickfeld, Wolfsburg (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/631,646

(22) PCT Filed: Jul. 17, 2018

(86) PCT No.: PCT/EP2018/069399
§ 371 (c)(1),
(2) Date: Jan. 16, 2020

(87) PCT Pub. No.: WO2019/016211
PCT Pub. Date: Jan. 24, 2019

(65) Prior Publication Data
US 2020/0213195 A1 Jul. 2, 2020

(30) Foreign Application Priority Data
Jul. 18, 2017 (DE) ...................... 10 2017 212 256.0

(51) Int. Cl.
*H04L 41/0813* (2022.01)
*H04L 41/0806* (2022.01)
(Continued)

(52) U.S. Cl.
CPC ...... *H04L 41/0813* (2013.01); *H04L 41/0809* (2013.01); *H04L 61/5069* (2022.05); *H04L 2101/663* (2022.05); *H04L 2101/668* (2022.05)

(58) Field of Classification Search
CPC ............. H04L 41/0813; H04L 61/2069; H04L 61/6068
(Continued)

(56) References Cited

U.S. PATENT DOCUMENTS 7,380,025 B1 * 5/2008 Riggins ................... H04L 41/12 710/10
7,508,775 B2 3/2009 Ackermann-Markes et al.
(Continued)

FOREIGN PATENT DOCUMENTS

CN 1781283 A 5/2006
CN 104113484 A 10/2014
(Continued)

OTHER PUBLICATIONS

Office Action for Korean Patent Application No. 10-2020-7004139; dated Nov. 27, 2020.
(Continued)

*Primary Examiner* — Mahran Y Abu Roumi
(74) *Attorney, Agent, or Firm* — Barnes & Thornburg, LLP

(57) ABSTRACT

A method for configuring identical network components wherein network components are each connected to a physical port of a network switch via a network cable. An additional network station is also connected to the network switch. Configuration messages are transmitted from the additional network station to the network components wherein the configuration message of each network component communicates the physical port of the network switch to which the network component is connected. The network component performs a reconfiguration of its function in the network corresponding to the connection to the physical port.

15 Claims, 4 Drawing Sheets

(51) Int. Cl.
  *H04L 61/5069* (2022.01)
  *H04L 101/663* (2022.01)
  *H04L 101/668* (2022.01)

(58) Field of Classification Search
  USPC .......................................................... 709/225
  See application file for complete search history.

(56) References Cited

U.S. PATENT DOCUMENTS

| | | | |
|---|---|---|---|
| 8,751,617 B2 | 6/2014 | Claes et al. | |
| 8,914,170 B2 | 12/2014 | Kraeling et al. | |
| 9,780,999 B2 | 10/2017 | Anderson et al. | |
| 9,948,900 B2* | 4/2018 | Hinkel | H04N 7/181 |
| 2003/0037163 A1* | 2/2003 | Kitada | H04L 12/4645 |
| | | | 709/236 |
| 2004/0064559 A1 | 4/2004 | Kupst et al. | |
| 2006/0209714 A1* | 9/2006 | Ackermann-Markes | |
| | | | H04L 12/4645 |
| | | | 370/254 |
| 2006/0230126 A1* | 10/2006 | Bhogal | H04L 67/125 |
| | | | 709/220 |
| 2008/0263185 A1* | 10/2008 | Anderson | H04L 41/0893 |
| | | | 709/220 |
| 2010/0161798 A1* | 6/2010 | Ruppert | G07F 17/3225 |
| | | | 707/769 |
| 2010/0205281 A1 | 8/2010 | Porter et al. | |
| 2013/0286833 A1* | 10/2013 | Torres | H04L 43/10 |
| | | | 370/235 |
| 2015/0215274 A1 | 7/2015 | Imadali et al. | |
| 2016/0072754 A1* | 3/2016 | Chen | H04L 12/1836 |
| | | | 370/392 |
| 2016/0352574 A1* | 12/2016 | Cudak | H04L 41/0886 |
| 2017/0033986 A1* | 2/2017 | Anderson | H04L 12/4625 |
| 2017/0163774 A1* | 6/2017 | Boucadair | H04L 69/14 |

FOREIGN PATENT DOCUMENTS

| | | |
|---|---|---|
| CN | 106406159 A | 2/2017 |
| DE | 102014225802 A1 | 6/2016 |
| EP | 2789129 A2 | 10/2014 |
| KR | 20090041407 A | 4/2009 |

OTHER PUBLICATIONS

Search Report for International Patent Application No. PCT/EP2018/069399; dated Oct. 23, 2018.
Office Action for Chinese Patent Application No. 201880047461.0; dated Dec. 28, 2021.

* cited by examiner

METHOD AND DEVICE FOR CONFIGURING IDENTICAL NETWORK COMPONENTS, AND TRANSPORTATION VEHICLE

PRIORITY CLAIM

This patent application is a U.S. National Phase of International Patent Application No. PCT/EP2018/069399, filed 17 Jul. 2018, which claims priority to German Patent Application No. 10 2017 212 256.0, filed 18 Jul. 2017, the disclosures of which are incorporated herein by reference in their entireties.

SUMMARY

Illustrative embodiments relate to the technical field of configuration of network components. Since the network components must be identical in their functional scope, they must be configured for individualization. Illustrative embodiments further relate to a device for configuring identical network components, and a transportation vehicle into which a disclosed device is integrated.

BRIEF DESCRIPTION OF THE DRAWINGS

An example embodiment is shown in the drawings and is explained in detail below with reference to the figures, in which.

DETAILED DESCRIPTION

Figure 1:
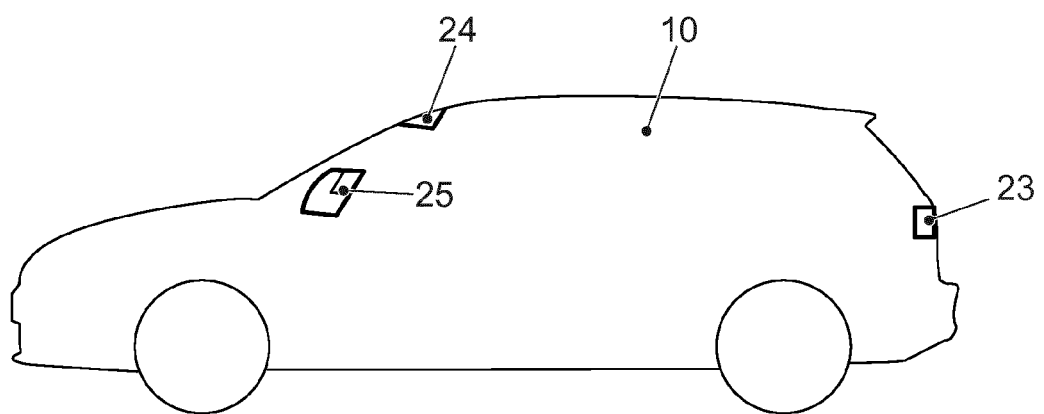
FIG. 1 shows a transportation vehicle which is equipped with identical network component.

A multiplicity of control units are installed in modern transportation vehicles. A number of control units, such as, e.g., the engine control unit, transmission control unit, ESP control unit, chassis control unit, etc., are used for the powertrain alone. In addition, still further control units are also provided which are installed in the transportation vehicle body area and perform specific comfort functions. The door or window lifter control units, air conditioning control units, seat adjustment control units, airbag control units, inter alia, are mentioned as examples. Control units belonging to the infotainment domain, such as camera control units for environment monitoring, a navigation device, a RADAR (Radio Detection and Ranging) or LIDAR (Light Detection and Ranging) device, a communication module and an entertainment device with TV, radio, video and music function are furthermore provided.

The control units of the different categories are typically networked in each case with a separate bus designed accordingly for the device category. A plurality of different bus systems can therefore be used in the transportation vehicle. The different bus systems can be interconnected via gateways to enable a data exchange. The CAN (Controller Area Network) bus is typically used in the powertrain control unit domain, and similarly in the comfort control unit domain. Other bus systems are also used in the infotainment domain, such as bus systems based on Ethernet technology, e.g., AVB (Audio Video Bridging) which is based on the standard family according to the IEEE 802.3 standard. Bus systems in which the data transmission takes place via optical waveguides are also usable. The MOST (Media Oriented System Transport) bus or the D2B bus (Domestic Digital Bus) are mentioned as examples.

A plurality of identical network components are increasingly used in a transportation vehicle. These are normally specific control units which are installed multiple times in the transportation vehicle with identical hardware and software. Examples of control units of this type are camera control units for a surround view system, a plurality of RADAR or LIDAR devices, a number of door control units or a number of sensors such as, e.g., wheel speed sensors. One problem with the networking of a plurality of identical network components is that the components are installed at different locations in the transportation vehicle and are then intended to perform an individualized function according to the location.

However, no identically configured network participants are permitted within one network, since the addressing mechanisms of the network do not otherwise operate. In the IP communication domain, i.e., a communication taking place at the Network Layer according to the ISO/OSI reference model according to the Internet Protocol, mechanisms exist for network autoconfiguration (e.g., DHCP (Dynamic Host Configuration Protocol), or SLAAC (Stateless Address Autoconfiguration)), as a result of which address conflicts can be avoided. Ethernet networks are also used in the transportation vehicle for the networking of such components where protocols of this type are usable for autoconfiguration, but the control unit does not know as a result where it is installed in the transportation vehicle. A communication partner wishing to communicate, e.g., with the camera in the right-hand external mirror does not therefore know the address information of the participant at this installation location.

All ports on an Ethernet switch are normally equivalent, so that the port to which a component is connected is functionally irrelevant. It is also not possible without additional outlay for a network participant to be informed by a network switch of the physical port to which it is connected.

A system and method for configuring identical devices in a transportation vehicle is known from document US 2017/0 033 986 A1. A network switch is used to which the common parts (sensors) are connected. A configuration message is transmitted to the respective sensor. The sensor then configures itself according to the information contained in the configuration message. The proposed solution is based on the use of VLAN ID addresses, corresponding to virtual LAN ID.

A method for the automatic configuration of devices connected to the terminals of a network switch is known from US 2016/0 352 574 A1, the method being based on correlation of device parameter settings of the network switch and the connected devices.

The performance of a configuration of devices connected to a network switch based on "Policy Settings" is known from US 2008/0 263 185 A1.

The identification of the physical location during the configuration of devices connected to a network switch with an LLDP protocol is known from US 2010/0 205 281 A1.

A device and method in which an IPv6 address is formed for a transportation vehicle from a manufacturer's vehicle number VIN is known from US 2015/0 215 274 A1.

The disclosed embodiments aims to find a practicable implementation for the network configuration with which it is possible to inform a network component with regard to the physical port of a network switch to which it is connected. The network component thereby learns of the role that it must take on in the network. The network component can then load the configuration matching the role.

This is achieved by a method and a device for configuring identical network components as claimed in claim 1 and claim 11, and a transportation vehicle as claimed in claim 13.

The single unique feature by which common-component control units in the transportation vehicle can be uniquely identified is their electrical connection. The contacts of the plug-in connector to a control unit with which a specific network component is connected are precisely defined through the design of the on-board power supply system (cable harness of the transportation vehicle).

For the method for configuring identical network components which are connected in each case via a network cable to a physical port of a network switch, wherein at least one further network station is connected to the network switch, it is beneficial if a configuration message is transmitted in each case by the further network station to a network component. The physical port of the network switch to which the network component is connected is communicated to the respective network component through the configuration message. The method is further characterized in that the network component performs a reconfiguration in respect of its function in the network according to the connection to the physical port. The network component is then configured according to its role defined by the installation location and can either provide the data with corresponding additional information or can transmit the data immediately to the correct location where they are intended to be processed. Additional costs incurred through the development and production of a plurality of component options are thereby also avoided. Such additional costs are also incurred through the logistics (production spare part business) and the variant control (a plurality of part numbers). This arises entirely from the technical necessity of having to uniquely identify all network components.

The configuration method is designed in such a way that, if the functional scope of the identical network components is the same, the network components are configured according to a default function of the network component when they are connected to the network switch. This default function is then provided redundantly in the network, but mistakes in terms of the function of a network component are avoided.

It is beneficial for the method if an option of the Ethernet standard family is used as the network technology for connecting the network components. In the case of a networking of the devices based on an option of the Ethernet standard family, the physical port of an Ethernet switch to which the network component is connected is thus known to the network components through the method.

The 100BASE-T1 or 1000BASE-T1 option of the Ethernet standard family can be used here. This option has been developed particularly for use in transportation vehicles. The automotive industry has specified the bit transmission layer as the communication standard for Automotive Ethernet. This standard is published by the IEEE in two options as 100BASE-T1 or 1000BASE-T1 as part of the IEEE P802.3bp specification.

Although unicast addresses can also be used in the method for addressing the network components, it is beneficial if a multicast destination address from a predefined subnetwork address range is used for the transmission of a configuration message and the network components are preconfigured in such a way that they respond to messages which are addressed to one of the multicast destination addresses from the predefined subnetwork address range. In a simple Ethernet network switch, the definition of specific multicast groups is already supported by the software. This can be exploited here.

The network switch can be configured in such a way that only one defined physical port is recorded in an assignment table for each multicast destination address from the predefined subnetwork address range to forward the message which is addressed to the respective multicast destination address. A multicast group with only one single member is therefore formed for each multicast address for an individualization of a network component.

It is furthermore beneficial for the method if IPv6 addresses are used for the destination addressing and the predefined subnetwork address range for the multicast destination addresses used for the configuration from the multicast address range permitted for IPv6, in particular, during a configuration of up to 16 identical network components, corresponds to the range ff14::1:0/124.

It is then also beneficial here if IPv6 unicast addresses are used for the source addressing and an address from the Unique Local Address range fc00::/7 permitted for IPv6 is assigned in each case to the network components and to the further network station.

The configuration message can be designed in such a way that the necessary details of the configuration are contained therein. In one application, it suffices if the information relating to the destination address and the associated transport port number to which the network component is intended to transmit its data following reconfiguration, and also optionally the source address which is intended to be recorded as the sender address when the data are transmitted, are contained in the configuration message. With this type of configuration, any configurations can be set since the configuration details are also supplied.

If the UDP protocol, corresponding to the User Datagram Protocol, is used, the transport port number can correspond to a UDP port number.

In a different example embodiment, only a configuration number is communicated to the network component in the configuration message. The addressed network component performs a reconfiguration on the basis of the received configuration number according to the configuration option stored in a table under the configuration number. However, only predefined configurations can be set in this way.

It is also beneficial if the configuration message is transmitted in a periodically repeated manner to the respective network component. A dynamic response can be achieved through regular transmission of the configuration message. Components can thereby be exchanged as required (even during ongoing operation). After a short time, a functioning configuration is repeatedly restored. This is important for repair purposes when spare parts are exchanged.

For a device having a number of identical network components which are connected in each case via a network cable to a physical port of a network switch, wherein at least one further network node is connected to the network switch, the device being designed to carry out the method, the benefits corresponding to the above-mentioned method operations apply.

The same applies to a transportation vehicle into which a device of this type is integrated.

The use in a transportation vehicle can take place in one example in such a way that the identical network components correspond to a number of cameras or ultrasound sensors or RADAR sensors, or LIDAR sensors for environment monitoring, or to a number of door control devices or to a number of sensors such as wheel speed sensors.

In one extension. The CAN controller, when transmitting messages, automatically provides the messages with current timestamps of the network time.

The present description illustrates the principles of the disclosure. The person skilled in the art will obviously be able to design different arrangements which are not explicitly described here but which embody principles of the disclosure and are similarly intended to be protected within its scope.

The method for the autoconfiguration of identical network components is described below using the example of a surround view system deployed in a transportation vehicle. All four sides of the transportation vehicle are monitored by cameras. The transportation vehicle is shown in FIG. 1 and is denoted with the reference number 10.

A passenger transportation vehicle is shown. However, any other transportation vehicles could be considered as a transportation vehicle. Examples of further transportation vehicles are: buses, commercial vehicles, in particular, trucks, agricultural machinery, construction machinery, motorcycles, track vehicles, etc. The disclosed embodiments would generally be usable in agricultural vehicles, track vehicles, watercraft and aircraft.

Reference number 23 denotes a camera which is intended to perform its function as a reversing camera. Reference number 24 denotes a camera which is used as a front camera for environment monitoring. A camera 25 which monitors the left side of the transportation vehicle environment is also installed in the left-hand external mirror. A further camera 26 is correspondingly installed in the right-hand external mirror (not shown). All cameras are of identical design and are equipped with identical hardware and software to perform the surround view function. The reversing camera is therefore installed four times in the transportation vehicle 10 together with the central control unit which receives and processes the video data streams of all four cameras 23-26.

Figure 2:
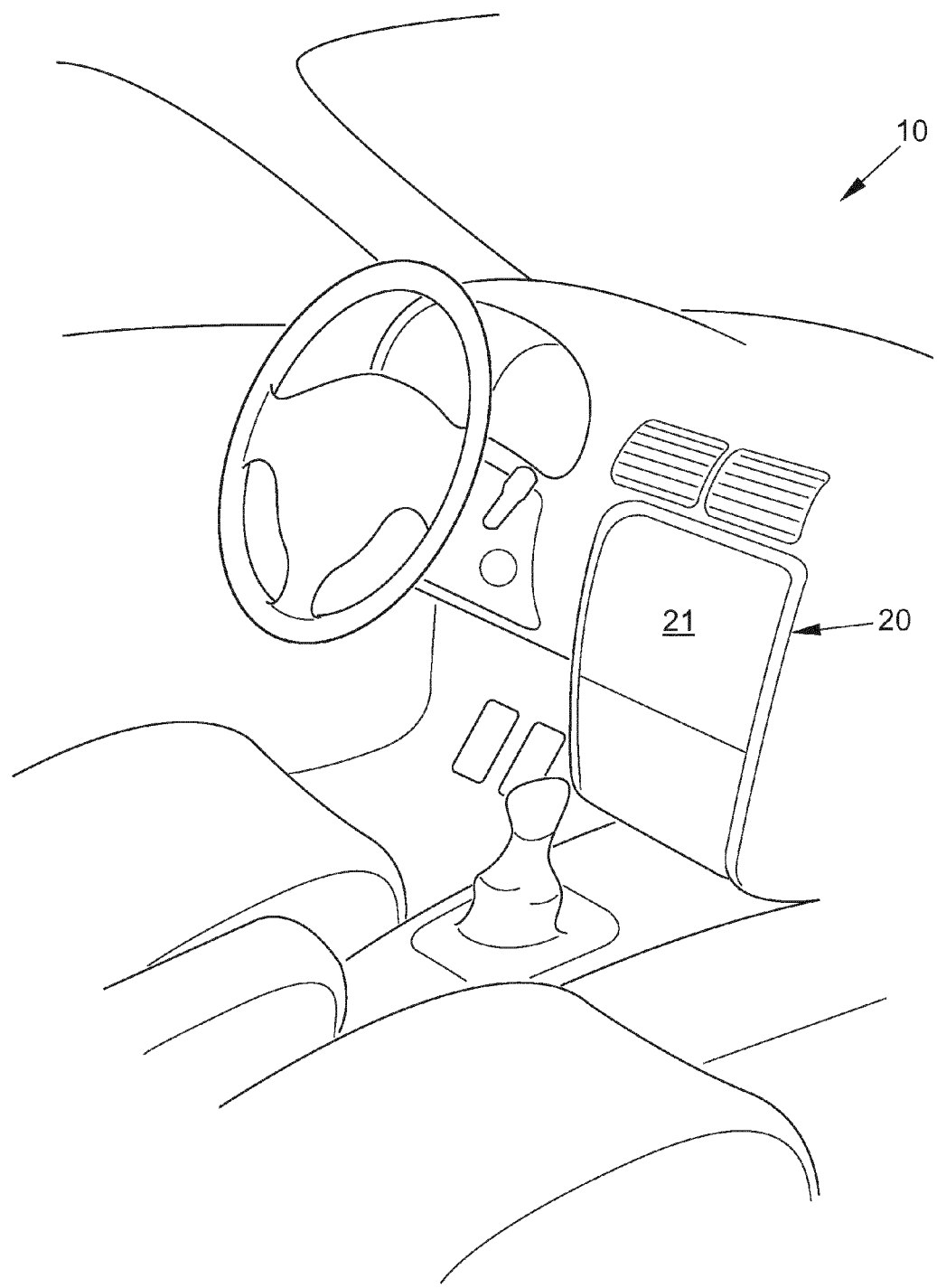
FIG. 2 shows the cockpit of the transportation vehicle shown in FIG. 1.

The images recorded by the cameras are displayed on the display unit of the infotainment system. FIG. 2 shows the cockpit of the transportation vehicle 10. The infotainment system is denoted with the reference number 20. The display unit of the infotainment system is housed in the central console and has the reference number 21. The display unit 21 is typically designed as a touch-sensitive screen 21 and serves, in particular, to operate functions of the transportation vehicle 10. For example, a radio, a navigation system, a playback of stored music pieces and/or an air conditioning system, other electronic devices or other comfort functions or applications of the transportation vehicle 10 can be controlled via the display unit. These functions are summarized using the term "infotainment system". In transportation vehicles, especially passenger transportation vehicles, an infotainment system refers to the combination of a car radio, navigation system, hands-free device, driver assistance systems and further functions in a central operating unit. The term infotainment system is a portmanteau word made up of the words information and entertainment.

Figure 3:
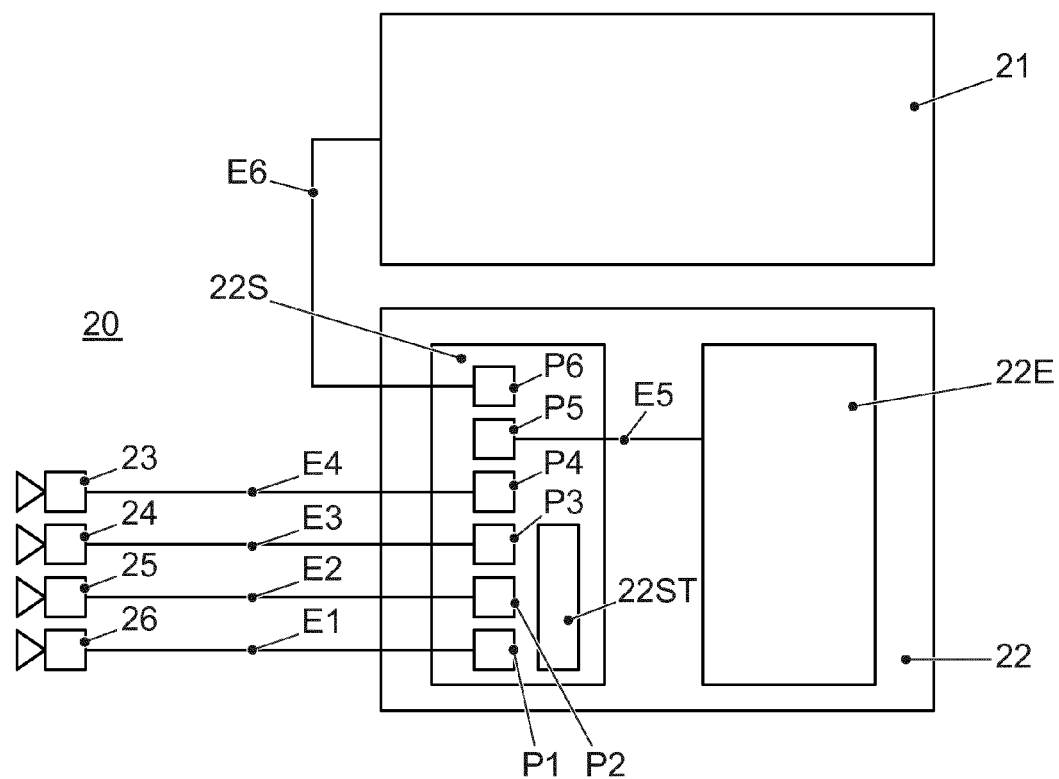
FIG. 3 shows a block diagram for a device for configuring identical network components.

FIG. 3 shows the components which are required to set up the surround view camera function. The four identical cameras are denoted with the reference numbers 23-26. The central control unit which receives the individual video streams from the cameras 23-26 has the reference number 22. The control unit 22 processes the video images in a computing unit 22E for display on the display unit 21. Either a panoramic image is calculated or the video images are scaled in such a way that they are displayed in different segments on the display unit 21. All four camera views do not always have to be displayed. During a reversing maneuver, only the image of the reversing camera 23 is shown. In an exit maneuver from an entrance, only the images of the front camera 24 and the side cameras 25, 26 are processed and displayed. In a turning maneuver, only the images of the front camera 24, reversing camera 23 and the side camera of the corresponding side are displayed. The top view visualization is also helpful. The camera images from the computing unit 22E are converted in the camera control unit 22 in such a way that they appear as a surround view from above onto the transportation vehicle. A view of the transportation vehicle 10 from above is similarly shown.

Each camera 23-26 is connected via a separate network cable E1 to E4 to a port P1 to P4 of the network switch 22S. In the example embodiment, the network switch is integrated into the camera control unit 22. In a different example, the network switch 22S could also be designed as a separate component. A 6-port switch is sufficient for the application described. The port P5 is connected via the network cable E5 to the computing unit 22E. Finally, the camera control unit 22 is connected via the port P6 and the network cable E6 to the display unit 21.

An option of the Ethernet standard family is used as the network technology for networking the components 21 to 26. This is appropriate as it involves the networking of components in the infotainment domain. In this domain, ready-made transmission protocols exist such as IP (Internet Protocol), UDP (User Datagram Protocol), RTP (Real-time Transport Protocol) TCP (Transmission Control Protocol) which can be used. The Ethernet network technology corresponds largely to the IEEE 802.3 standard. Special options are being developed for the use of this technology in transportation vehicles. One of these options is the aforementioned 100BASE-P1 option. Ready-made network switches 22S which can be used already exist for this option.

As described, all four cameras 23-26 are identical. This means that the specific camera 23-26 can take on five different roles ("reversing camera only", surround view camera behind, surround view camera in front, surround view camera on the right, surround view camera on the left).

The cameras 23-26 are programmed by default in such a way that they assume the role of "reversing camera only" when they are switched on for the first time. The cameras 23-26 must be reconfigured so that they can take on a different role. The configurations differ in terms of the network configuration (particularly the IP addresses), but also in terms of camera-specific parameters.

The autoconfiguration is achieved according to the proposed method with a special use of multicast addresses. The underlying idea is that multicast groups can be configured in the Ethernet switch 22S in such a way that specific multicast messages are forwarded to only one single physical port P1-P4 of the Ethernet switch 22S. However, only one camera is connected to this port. An assignment table 22ST in which the ports to which the message with this multicast address is intended to be forwarded are recorded for each used multicast address is installed in the Ethernet switch 22S for this purpose.

The physical port P1-P4 to which a camera 23-26 is connected is uniquely defined by the on-board power supply system (cable harness) of the transportation vehicle 10.

Each camera 24-26 which is intended to be reconfigured receives a configuration message from the central control unit 22, the message being transmitted to a specific multicast group. A network component is thus informed of the physical port to which it is connected. According to one special characteristic, only one member is permitted in the formation of the multicast group. This member corresponds precisely to the one camera which is intended to be reconfigured.

In the specific example, only one of four stored configurations is selected by the multicast configuration message. It is also possible for the complete configuration to be transmitted in this way, so that the component can adopt not only one of a plurality of previously known configurations, but also any given configuration.

In the example embodiment, it is assumed that IPv6 addresses are used. However, the disclosed embodiments could also be implemented using IPv4 addresses. Compared with the IPv4 messages, the IPv6 addresses have been extended from 32 bits to 128 bits in length. A different notation has therefore been agreed here also. The addresses are no longer indicated with three-digit decimal numbers separated by a period, but rather by four-digit hexadecimal numbers separated by a colon.

An IPv6 address is written in hexadecimal notation as eight 16-bit blocks, each separated by a colon. For simplification, the leading zeros can be omitted in each block and a long zero block can be summarized as a double colon "::".

As in IPv4 notation, it can be indicated by a prefix, e.g., /124, that an address range (subnetwork) rather than an individual address is involved. In the address indication ff14::1:0/124, the prefix/124 indicates that the subnetwork mask is 124 bits in size.

There are therefore precisely 16 addresses (128 bits−124 bits=4 bits ˆ=16 addresses).

The written out address relates to the addresses from ff14:0000:0000:0000:0000:0000:0000:0001:0000: to ff14:0000:0000:0000:0000:0000:0000:0001:000f.

Each of the cameras 23-26 is intended to be able to receive messages on all 16 multicast addresses. In the example considered, camera 23 is used as a reversing camera. This corresponds to the configuration which it takes on in any case by default. It is therefore not necessary for a configuration message to be transmitted to it. In a different example embodiment, it would be simple to form a configuration message for this camera 23 also.

The configuration message for camera 26 is sent in the example according to FIG. 3 by the processor 22E, e.g., to the address ff14::1:1 (ff14:0000:0000:0000:0000:0000: 0000:0001:0001). The switch 22S is configured via the allocation table 22ST in such a way that it forwards the message with the multicast destination address ff14::1:1 to the physical port P1 only.

The configuration message for camera 25 is sent by the processor 22E, e.g., to the destination address ff14::1:2 (ff14:0000:0000:0000:0000:0000:0000:0001:0002). The switch 22S is configured via the allocation table 22ST in such a way that the address ff14::1:2 is forwarded to the physical port P2 only.

The configuration message for camera 24 is sent by the processor 22E, e.g., to the destination address ff14::1:2 (ff14:0000:0000:0000:0000:0000:0000:0001:0002). The switch 22S is configured via the allocation table 22ST in such a way that the address ff14::1:2 is forwarded to the physical port P3 only.

As a result of the definition of the multicast groups with one member only, the configuration message for camera 26 also arrives precisely at camera 26 only, etc.

As is known, the destination address (destination) and the source address (source) are always indicated in an IPv6 packet in the same way as in IPv4. A unicast address is always indicated as a source address for the aforementioned configuration messages. Generally speaking, the source addresses are always unicast addresses and are irrelevant to the network switch 22S in the example embodiment considered. The source address fdxx::2 is always best recorded for the configuration messages which are transmitted by the processor 22E, wherein the indication xx is a placeholder for any given value. These addresses belong to the special range of "Unique Local Addresses", as defined for IPv6. The "Unique Local Addresses" range relates to the range fc00::/7 which also includes the addresses fdxx::2.

This address range is reserved for site-local addresses, i.e., addresses which are not routed into the Internet. A plurality of different local ranges are allowed to use the addresses from this range without hindrance, since they are not routed into other networks.

Figure 4:
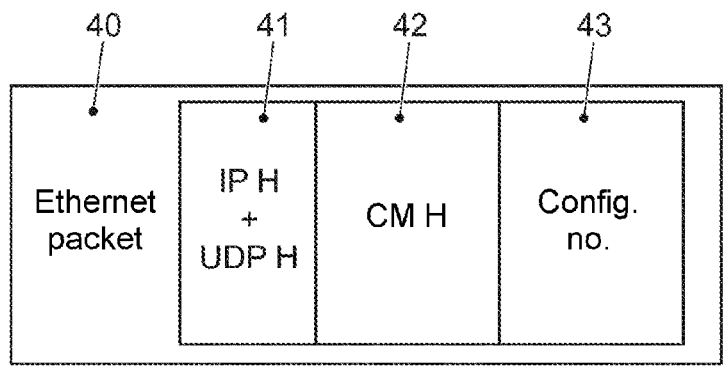
FIG. 4 shows a first example of a configuration message containing a configuration number of a predefined configuration instead of the configuration details.

FIG. 4 now shows the structure of the first type 40 of a configuration message. The configuration message is transmitted as a UDP packet according to the UDP protocol. The UDP packet is transmitted, embedded in an IP packet which is in turn embedded in an Ethernet Packet 40. The Ethernet MAC header is located at the start of the Ethernet data frame and is then followed by the IP header and the UDP header in field 41. Two fields can also be provided for this purpose. Two fields follow in the useful data field of the UDP packet. Field 42 represents the header of the configuration message. The configuration number is recorded in field 43. In the example embodiment, four different configurations are distinguished. A number from "1" to "4" is therefore recorded as the configuration number. Four different configurations thereof have already been stored in the memory of the network component (here camera 23-26) during the loading of the software. The configuration number in field 43 is extracted on reception of the configuration message of the first type 40 (identifiable by the configuration message header 42). The configuration details matching this number are loaded from the memory and the camera is set accordingly. The configuration procedure is then completed. The camera 24 is thus configured as the front camera, the camera 25 as the camera on the left and the camera 26 is thus configured as the camera on the right.

Figure 5:
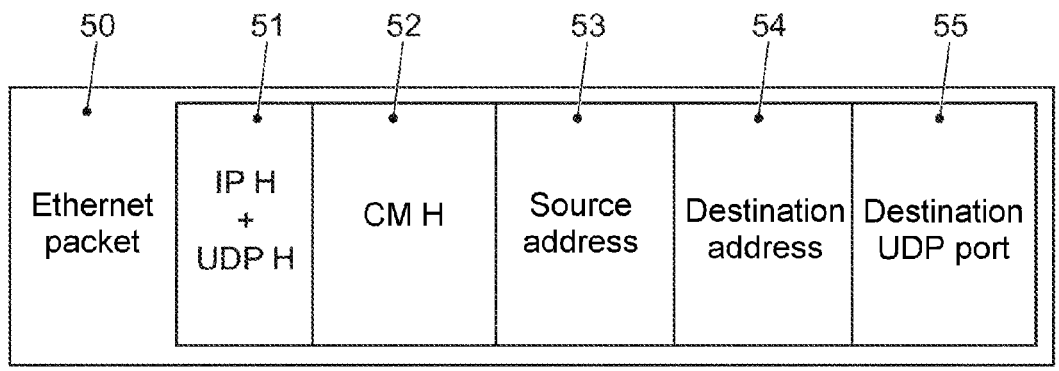
FIG. 5 shows a second example of a configuration message containing the configuration details.

FIG. 5 shows the structure of the second type 50 of a configuration message. The configuration message is similarly transmitted as a UDP packet according to the UDP protocol. The UDP packet is transmitted, embedded in an IP packet which is in turn embedded in an Ethernet packet 40. Part of the Ethernet packet is an Ethernet data frame. The receiver MAC (Medium Access Control) address and the transmitter MAC address along with further information are located in the header of the Ethernet data frame. The IP header then follows in the data field of the Ethernet data frame, and then the UDP header in field 51. Four fields follow in the useful data field of the UDP packet. Field 52 represents the header of the configuration message. The source address which is intended to be recorded by the camera as the source address during the transmission of its data is recorded in field 53. The destination address which is intended to be recorded by the camera as the destination address during the transmission of its data is located in field 54. The destination UDP port number which is intended to be recorded by the camera as the destination UDP port number during the transmission of its data is also located in field 55. The destination UDP port number corresponds to a transport port number. With it, the receiving station is informed of the software port from which the data are intended to be retrieved. Different port numbers are installed on the destination computer. The program for processing the video data supplied by the camera "eavesdrops" on the destination port which has been indicated in the configuration message of the second type 50. In one example, the different destination port numbers 2001 to 2004 could be used for the different cameras 23-26. A source UDP port number is typically also indicated in the datagram containing the video data, but this port number does not have to match the destination UDP port number.

Figure 6:
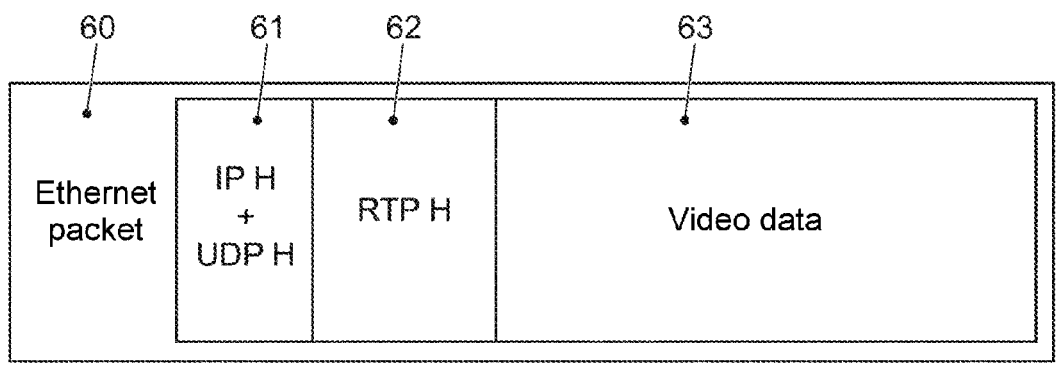
FIG. 6 shows an example of a data transport message which is transmitted by a network component following reconfiguration.

FIG. 6 also shows the basic structure of the type 60 of a UDP datagram with which video data are transmitted from the camera to the central camera control unit 22. The meaning of fields 60 and 61 corresponds to those of fields 40, 41 and 50, 51 as explained above. The Real-time Transport Protocol RTP is suitable for the transmission of video data. It serves to transport multimedia data streams (audio, video, text, etc.) via networks, i.e., to encode, packetize and transmit the data. RTP is a packet-based protocol and is normally operated via UDP. RTP can be used both for unicast connections and for multicast communication on the Internet. An RTP header is then located in first position in the data field of the UDP packet in field 62, followed by the video data in field 63.

The RTP packets with the video data are received by the switch 22S via the respective port P1-P4 and are all forwarded to the port P5. The computing unit 22E retrieves the data at the respective destination UDP port number, processes the data, e.g., for a surround view, and in turn transmits the video data of the surround view to the display unit 21. The network switch receives the data via port P5 and forwards them to port P6. The display unit 21 receives the video data for the surround view and displays them on the display panel. It is appropriate if a multicast address is similarly used for the addressing of the display unit 21. If, e.g., a plurality of display units are installed in the transportation vehicle, e.g., in the cockpit and in the rear area, a plurality of addressees can easily be defined for the video stream by defining the multicast group and the video stream does not have to be forwarded multiple times from the switch. As an example, the multicast address ff14::5 could be assigned to the display unit 21. A dynamic behavior can be achieved through regular transmission of the configuration message. As a result, network components can be exchanged as required (even during ongoing operation). After a short time, a functioning configuration is repeatedly restored. This is important for repairs and spare parts.

To avoid a malfunction of the network which can occur because a switchover in a network component is not functioning or has not yet taken place, incorrectly configured messages can be rejected in the network switch 22S. Five video stream connections are identifiable in the figure. In a correctly functioning system, the stream from the camera 23 is allowed to be present on the physical port P4 only. Data packets of this type are rejected on all other ports P2-P6.

In the example shown, it is irrelevant to the display unit 21 whether it is connected directly to a camera which is set in this case to the "reversing camera only" default configuration or whether it is connected to the optional camera control unit 22 to which the four cameras 23-26 are connected. The camera control unit 22 itself similarly takes on the "reversing camera only" network configuration and ensures through the described method that the four cameras 23-26 in each case change to a different configuration. The behavior is determined only by the installation of the components. No further configuration is necessary in the cameras 23-26 and in the camera control unit 22.

The disclosure is not restricted to the example embodiments described here. There is scope for different adaptations and modifications which the person skilled in the art would take into consideration on the basis of his technical knowledge as also belonging to the disclosure. All examples mentioned herein and also contingent formulations are to be understood as being without restriction to such specifically cited examples. It will thus, for example, be acknowledged by the person skilled in the art that the block diagram shown here represents a conceptual view of an example of a circuit arrangement. It should similarly be recognized that an illustrated flow diagram, state transition diagram, pseudocode and the like represent different variations for visualizing processes which are essentially stored in computer-readable media and can thus be executed by a computer or processor.

It should be understood that the proposed method and the associated devices can be implemented in different forms of hardware, software, firmware, special processors or a combination thereof. Special processors can comprise Application-Specific Integrated Circuits (ASICs), Reduced Instruction Set Computers (RISCs) and/or Field Programmable Gate Arrays (FPGAs). The proposed method and the device may be implemented as a combination of hardware and software. The software may be installed as an application program on a program memory device. This typically involves a machine based on a computer platform which has hardware, such as, for example, one or more central units (CPUs), a Random Access Memory (RAM) or one or more input/output (I/O) interfaces. An operating system is furthermore typically installed on the computer platform. The different processes and functions which have been described here may be part of the application program, or a part which is executed via the operating system.

REFERENCE NUMBER LIST

10 Transportation vehicle
20 Infotainment system
21 Infotainment display unit
22 Infotainment control unit
22E Further network node
22S Networks which
22ST Assignment table
23 1st network component
24 2nd network component
25 3rd network component
26 4th network component
P1 1st port
P2 2nd port
P3 3rd port
P4 4th port
P5 5th port
P6 6th port
E1 1st network cable
E2 2nd network cable
E3 3rd network cable
E4 4th network cable
E5 5th network cable
E6 6th network cable 40 Type 1 configuration message
41 IP & UDP header
42 Type 1 configuration message header
43 Configuration number
50 Type 2 configuration message
51 IP & UDP header
52 Type 2 configuration message header
53 Source address
54 Destination address
55 Transport port number
60 Data transport message
61 IP & UDP header
62 RTP header
63 Video data

The invention claimed is:

1. A method for configuring identical network components, each connected via a network cable to a physical port of a network switch, wherein at least one further network station is connected to the network switch, wherein configuration messages are transmitted by the further network station to the network components, the method comprising:
using a multicast address for the transmission of a configuration message;
and preconfiguring the network components so the network components respond to messages addressed to one of a plurality of multicast destination addresses;
communicating the physical port of the network switch to which a corresponding network component is connected to the corresponding network component of the identical network components via the configuration message;
performing, by the corresponding network component, a function reconfiguration in the network based on the connection to the physical port, and using IPv6 addresses or IPv4 addresses from a predefined subnetwork address range for the multicast destination addressing, wherein the predefined subnetwork address range for the multicast destination addresses used for the configuration originates from the multicast address range permitted for IPv6 or IPv4, wherein the network switch is configured to record only one defined physical port in an assignment table for each multicast destination address from the predefined subnetwork address range to forward the message which is addressed to the respective multicast destination address, wherein the configuration message is periodically transmitted to the corresponding network component, and wherein details necessary for the configuration are contained in the configuration message, and a source address which is intended to be recorded as a sender address of the network component when data is transmitted, are communicated therein to the network component
wherein a configuration number is communicated to the network component in the configuration message, and the network component performs a reconfiguration based on the configuration number according to a configuration variant stored in a table under the configuration number,
and wherein the configuration message includes a destination port number, which corresponds to and is distinct from a source port number for the same port.

2. The method of claim 1, wherein functional capabilities of the identical network components is identical and the identical network components are configured based on a default function when the network components are connected to the network switch.

3. The method of claim 1, wherein the identical network components comprises up to 16 identical network components, and the IPv6 addresses are used, and wherein the predefined subnetwork address range, corresponds to the range ff14::1:0/124.

4. The method of claim 1, wherein the network for connecting the network components corresponds to one of variants 100BASE-T1 and 1000BASE-T1 according to Ethernet specification IEEE P802.3 bp.

5. The method of claim 1, wherein IPv6 unicast addresses are used and an address from a Unique Local Address range fc00::/7 permitted for IPv6 is assigned in each case to the network components and to the further network station.

6. The method of claim 1, wherein a transport port number that corresponds to a destination User Datagram Protocol port number is communicated to the network component.

7. A device comprising: a plurality of identical network components connected in each case via a network cable to a physical port of a network switch, wherein at least one further network node is connected to the network switch, wherein the device configures the identical network components, wherein configuration messages are transmitted by the further network node to the network components, wherein a multicast address is used for the transmission of a configuration message, wherein the identical network components are preconfigured so the identical network components respond to messages addressed to one of the multicast destination addresses, wherein the physical port of the network switch to which a network component of the identical network components is connected is communicated to the respective network component through the configuration message, wherein the network component, then performs a function reconfiguration in the network based on the connection to the physical port, and wherein IPv6 addresses or IPv4 addresses from a predefined subnetwork address range are used for the multicast destination addressing, and the predefined subnetwork address range for the multicast destination addresses used for the configuration originates from the multicast address range permitted for IPv6 or IPv4, wherein the network switch is configured so that only one defined physical port is recorded in an assignment table for each multicast destination address from the predefined subnetwork address range to forward the message which is addressed to the respective multicast destination address, wherein the configuration message is periodically transmitted to the corresponding network component, and wherein details necessary for the configuration are contained in the configuration message, and a source address which is intended to be recorded as a sender address of the network component when data is transmitted, are communicated therein to the network component
wherein a configuration number is communicated to the network component in the configuration message, and the network component performs a reconfiguration based on the configuration number according to a configuration variant stored in a table under the configuration number,
and wherein the configuration message includes a destination port number, which corresponds to and is distinct from a source port number for the same port.

8. The device of claim 7, wherein the network switch is integrated into the further network node.

9. A transportation vehicle, comprising: the device of claim 7.

10. The transportation vehicle of claim 9, wherein the identical network components correspond to a number of cameras or ultrasound sensors or RADAR sensors, corresponding to Radio Detection and Ranging, or LIDAR sensors, corresponding to Light Detection and Ranging for environment monitoring, or to a number of door control devices or to a number of sensors, such as wheel speed sensors.

11. The device of claim 7, wherein functional capabilities of the identical network components is identical and the identical network components are configured based on a default function when the identical network components are connected to the network switch.

12. The device of claim 7, wherein the identical network components comprises up to 16 identical network components, and the IPv6 addresses are used, and wherein the predefined subnetwork address range, corresponds to the range ff14::1:0/124.

13. The device of claim 7, wherein the network for connecting the network components corresponds to one of variants 100BASE-T1 and 1000BASE-T1 according to Ethernet specification IEEE P802.3 bp.

14. The device of claim 7, wherein IPv6 unicast addresses are used and an address from a Unique Local Address range fc00::/7 permitted for IPv6 is assigned in each case to the network components and to the further network station.

15. The device of claim 7, wherein a transport port number corresponds to a destination User Datagram Protocol port number is communicated to the network component.

* * * * *